United States Patent [19]

Ohta et al.

[11] Patent Number: 4,489,139
[45] Date of Patent: * Dec. 18, 1984

[54] MAGNETO-OPTIC MEMORY MEDIUM

[75] Inventors: Kenji Ohta, Yao; Akira Takahashi, Nara, both of Japan

[73] Assignee: Sharp Kabushiki Kaisha, Osaka, Japan

[*] Notice: The portion of the term of this patent subsequent to Jun. 28, 2000 has been disclaimed.

[21] Appl. No.: 476,345

[22] Filed: Mar. 17, 1983

Related U.S. Application Data

[63] Continuation of Ser. No. 337,132, Jan. 5, 1982, Pat. No. 4,390,600.

[30] Foreign Application Priority Data

Jan. 14, 1981 [JP] Japan ................................ 56-4090
Apr. 9, 1981 [JP] Japan ................................ 56-54070
Apr. 10, 1981 [JP] Japan ................................ 56-54711

[51] Int. Cl.$^3$ ............................................. B21D 39/00
[52] U.S. Cl. ................................... 428/621; 428/655; 428/694; 428/900; 428/928
[58] Field of Search ............... 428/621, 622, 630, 626, 428/624, 928, 451, 900, 655, 694; 75/123 E; 420/416; 427/131, 132

[56] References Cited

U.S. PATENT DOCUMENTS 2,813,789 11/1957 Glaser .................................. 75/123 E
3,717,504 2/1973 Aonuma et al. ..................... 428/626
4,293,621 10/1981 Togami ................................ 428/928

FOREIGN PATENT DOCUMENTS 0146207 11/1981 Japan ................................ 75/123 E
2071696 9/1981 United Kingdom .............. 75/123 E Primary Examiner—L. Dewayne Rutledge
Assistant Examiner—S. Kastler
Attorney, Agent, or Firm—Birch, Stewart, Kolasch & Birch

[57] ABSTRACT

A magneto-optic memory medium is disclosed which is made up by an acryl resin substrate having strip-like grooves, a magneto-optic magnetization film disposed on the substrate and having an axis of easy magnetization perpendicular to its surface. The magnetization film is made of amorphous ferromagnetic material such as GdTbFe, GdTbDyFe, SmTbFe, GdDyFe, TbCo or the like. A reflective film is provided overlying the magneto-optic magnetization film.

5 Claims, 2 Drawing Figures

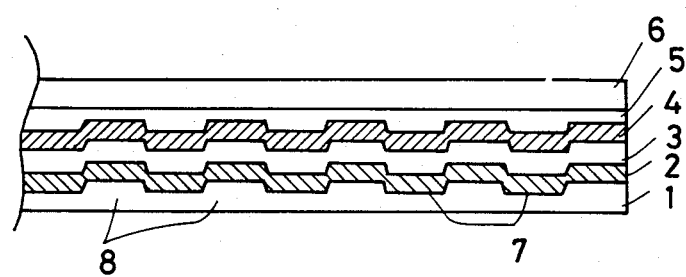
F I G. 1
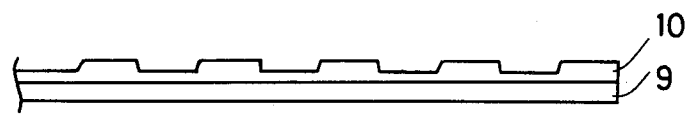
F I G. 2 ated, when the track survomechanism is in use. It is therefore desirable that guide tracks be formed in parallelism with signal-recording tracks for helping the survomechanism.

MAGNETO-OPTIC MEMORY MEDIUM

This application is a continuation of copending Ser. No. 337,132, filed on Jan. 5, 1982, now U.S. Pat. No. 4,390,600.

BACKGROUND OF THE INVENTION

This invention relates to a magneto-optic memory medium with which writing, reading and erasing of information are performed through application of a laser beam.

In recent years, a substantial amount of effort has been directed toward the development of an optical memory medium which satisfies various requirements including high density, large capacity and high speed access.

Of a wide range of various optical memory media, magneto-optic memory elements comprising a perpendicular magnetization layer as a memory material are most attractive thanks to its uniquie advantage that information can be erased after use and new information can be written thereon. The magneto-optic memory elements however have the disadvantage that they provide weak reproduced signals and exhibit bad signal-to-noise ratio (S/N ratio). Especially when reproduction of information relying upon reflected light from the magneto-optic elements, that is, the Kerr effect reproduction system is in use, the Kerr rotation angle of magnetic material is small and an improvement in S/N ratio is almost impossible. For this reason the prior art approaches were made in an attempt to increase the Kerr rotation angle; an improvement in magnetic material as a recording medium; and deposition of such a dielectric film as SiO and SiO$_2$. It was reported in "J. Appl. Phys." Vol. 45, No. 8, August 1974, for example, that the Kerr rotation angle increased from 0.7° to 3.6° by deposition of a SiO coating on a MnBi magnetic thin film as an example of the latter. However, the deposition of such a dielectric coating on a magnetic film increases the Kerr rotation angle, but on the other hand decreases the amount of the reflected light and S/N ratio improved no more than about twice. An improvement in S/N ratio is, therefore, not expected to a theoretical extent. In the case that the dielectric thin film typically of SiO and SiO$_2$ is deposited, it can not protect the magnetic material against corrosion. It is also impossible to sense recording bits when the diameter of the recording bits is of the order of 1 um and dust or other foreign objects of a diameter of approximately 1 um. It is therefore desirable that the thickness of the memory elements be between 0.5 and 2 mm for practical application. However, this requirement is in conflict with the above discussed requirement of increasing the Kerr rotation angle.

Meanwhile, an approach has been suggested; an amorphous magnetic film such as DyFe is deposited on a garnet substrate and information recorded on the DyFe film is transferred to the garnet substrate of good S/N ratio for readout (e.g., "Digest of the Fourth Annual Conference on Magnetics in Japan", 5a B-4). However, this method does not appear to be suitable for large capacity memory application because of difficulty in making a large area memory medium.

Apart from the foregoing problems, high density recording is indispensable for optical memory elements. Accordingly, since the diameter of the recording bits is of the order of 1 um as stated previously, survo technique including a focus survomechanism and a track survomechanism is necessary during writing, reading nd erasing. Otherwise, there is the need for a recording mechanism which is too complex and precise for practical application. Unlike the Philips video disk equipment of the MCA type which requires only reproducing information previously recorded, the magneto-optic recording device should write new information at the position where no information is contained, when the track survomechanism is in use. It is therefore desirable that guide tracks be formed in parallelism with signal-recording tracks for helping the survomechanism.

OBJECTS AND SUMMARY OF THE INVENTION

Accordingly, it is an object of the present invention to provide a magneto-optic memory medium where guide tracks are available for a survomechanism with magneto-optic enhancement without decreasing the amount of reflected light.

According to a broadest aspect of the present invention, a magneto-optic memory medium comprises a substrate having strip-like grooves, a magneto-optic magnetization film disposed on said substrate and having an axis of easy magnetization perpendicular to its surface, and a reflective film overlying said magneto-optic magnetization film.

In a preferred form of the magneto-optic memory medium, there is deposited on an acryl resin substrate a magnetic TbDyFe film having an axis of easy magnetization perpendicular to its surface. The acryl resin substrate is highly resistive to shock and easy to handle. Furthermore, guide tracks may be formed in the acryl resin more easily. The TbDyFe film has a Curie point of 75° C. and the acryl resin substrate has a softening point of less than 85° C., so that the acryl resin substrate is capable of undergoing extended use.

BRIEF DESCRIPTION OF THE DRAWINGS

For a more complete understanding of the present invention and for further objects and advantages thereof, reference is now made to the following description taken in conjunction with the accompanying drawings, in which:

FIG. 1 is a cross sectional side view, partially in an enlarged scale, showing a magneto-optic memory medium according to an embodiment of the present invention; and FIG. 2 is a cross sectional side view, partially in an enlarged scale, showing an exemplary substrate.

DETAILED DESCRIPTION OF THE INVENTION

Referring now to FIG. 1, there is illustrated in cross sectional side view a magneto-optic memory medium according to an embodiment of the present invention. A substrate 1 typically of acryl resin or glass with strip-like grooves 7 is prepared by a well known manner. In the case of the substrate 1 of acryl resin, plastic molding is available by which to form a grooved substrate at one time. Deposited on the substrate 1 is a perpendicular magnetization layer 2 of amorphous ferrimagnetic material consisting of rare earth metal and transition metal, for example, GdTbFe, GdTbDyFe, SmTbFe, GdDyFe, TbCo, etc., by sputtering, evaporation or other well known methods. The amorphous layer 2 is overlaid with a transparent dielectric layer 3 typically of SiO$_2$, SiO, MgF, TiO$_2$ or the like which in turn is overlaid with a reflective layer 4 made of Al, Cu, Au, Ag, Zn, Sn or the like. Furthermore, the reflective layer 4 lies sandwiched between the dielectric layer 3 and a support plate 6 by means of a proper adhesive. With such a medium structure, recording, reproducing and easing information are performed via the substrate 1. Recording tracks may be formed either in the strip-like grooved portions or valley portions 7 or non-grooved portions or ridge portions 8. This is true with guide tracks. In other words, the guide tracks may be formed fully in either the valley portions 7 or the ridge portions or half in the valley portions 7 and half in the ridge portions 8. Signals are therefore available for a track servo system through a differential level in the substrate 1. In the case where the magneto-optic medium is of a disc configuration, the strip-like grooves 7 may be formed coaxially or spirally. The magneto-optic film 2 is so sufficiently thin that reproducing light incident upon the magnetization layer undergoes a combination of the Karr effect caused by reflected light from the surface of the magnetization layer and the Faraday effect caused by light penetrating the magnetization layer, reflecting on the reflective layer 4 and traversing again the magnetization layer and increases its revolution angle several times as much as that caused by merely the Karr effect. The amount of returning light does not show less or no decrease.

The gist of the present invention rests in a combination of the grooved substrate and the reflective layer of enriching the magneto-optic performance, so that many modifications and changes are possible within the spirit of the invention. For example, the dielectric layer 3 may be eliminated or a metallic thin film of Al, Cr, Ti or the like may be provided between the dielectric layer 3 and the magnetization layer 2. A unit consisting of the substrate 1, the magnetization layer 2, the dielectric layer 3 and the reflective layer 4 may be bonded by the use of an adhesive 5 without using the support plate 6, thus realizing a bothsided magneto-optic memory medium. Further, as shown in FIG. 2, the substrate 1 may be set up by a lamination of a grooved plastic substrate 10 and a glass substrate 9. The recording tracks and the guide tracks are not necessarily required to be strip-like. Information characteristic of track identifying numbers and sector identifying numbers may be written.

The grooved-substrate 1 offers the advantage over the flat substrate: easiness of manufacture and simplicity of a manufacturing equipment, because the grooves in the substrate are helpful in positioning the manufacturing machine. On the contrary, the flat substrate requires complex and large-sized machining relying upon an air shaft.

As stated previously, the substrate is typically made of acryl resin and the magnetization layer is of TbDyFe with an axis of easy magnetization perpendicular to its surface. The acryl resin substrate is highly resistive to shock and easy to handle. Furthermore, guide tracks may be formed in the acryl resin more easily. The TbDyFe film has a Curie point of 75° C. and the acryl resin substrate has a softing point of less than 85° C., so that the acryl resin is capable of undergoing extended use.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magneto-optic memory medium consisting essentially of:
   a substrate having strip-like grooves;
   a magnetic film comprising a magneto-optic magnetization film having an axis of easy magnetization perpendicular to its surface disposed on said substrate, said magnetic film having an uneven surface which corresponds to the strip-like grooves formed in said substrate.

2. The magneto-optic memory medium of claim 1, wherein said substrate is selected from either an acryl resin substrate or a glass substrate.

3. A magneto-optic medium comprising:
   a substrate having strip-like grooves;
   a magnetic film disposed on said substrate, said magnetic film comprising a magneto-optic magnetization film having an axis of easy magnetization perpendicular to its surface, said film having an uneven surface which corresponds to the strip-like grooves formed in said substrate;
   a reflective film overlying said magnetic film, and
   a dielectric layer disposed between said magnetic film and said reflective film.

4. A magneto-optic memory medium comprising:
   a substrate having strip-like grooves;
   a magnetic film disposed on said substrate, said magnetic film comprising a magneto-optic magnetization film having an axis of easy magnetization perpendicular to its surface, said film having an uneven surface which corresponds to the strip-like grooves formed in said substrate, wherein said magnetic film is selected from at least GdTbFe or TbDyFe.

5. A magneto-optic memory medium comprising:
   a glass substrate having strip-like grooves,
   a magnetic film disposed on said substrate, said magnetic film comprising a magneto-optic magnetization film having an axis of easy magnetization perpendicular to its surface, said film having an uneven surface which corresponds to the strip-like grooves formed in said glass substrate wherein said magnetic film comprises GdTbFe,
   a dielectric layer, and
   an aluminum reflection layer overlying said dielectric layer.

* * * * *